United States Patent
Bonaric et al.

(10) Patent No.: US 12,533,208 B2
(45) Date of Patent: Jan. 27, 2026

(54) SURGICAL INSTRUMENT GUIDE TUBE

(71) Applicant: MedTech S.A., Montpellier (FR)

(72) Inventors: Patrice Bonaric, St georges d'Orques (FR); Fanny Blanchard, Castelnau-le-lez (FR)

(73) Assignee: MedTech S.A., Montpellier (FR)

( * ) Notice: Subject to any disclaimer, the term of this patent is extended or adjusted under 35 U.S.C. 154(b) by 507 days.

(21) Appl. No.: 17/668,159

(22) Filed: Feb. 9, 2022

(65) Prior Publication Data
US 2022/0265386 A1 Aug. 25, 2022

Related U.S. Application Data

(60) Provisional application No. 63/149,548, filed on Feb. 15, 2021.

(51) Int. Cl.
*A61B 90/50* (2016.01)
*A61B 34/30* (2016.01)

(52) U.S. Cl.
CPC .............. *A61B 90/50* (2016.02); *A61B 34/30* (2016.02)

(58) Field of Classification Search
CPC ......... A61B 90/50; A61B 34/30; A61B 90/11; A61B 34/70; A61B 2017/00477; A61B 17/3423; A61B 17/3421
See application file for complete search history.

(56) References Cited

U.S. PATENT DOCUMENTS

| | | | |
|---|---|---|---|
| 5,957,947 A * | 9/1999 | Wattiez | A61B 17/3417 606/185 |
| 2004/0260244 A1 * | 12/2004 | Piechowicz | A61B 17/3462 606/167 |
| 2008/0242939 A1 * | 10/2008 | Johnston | A61B 17/0218 600/204 |
| 2009/0076464 A1 * | 3/2009 | Gresham | A61M 39/0247 600/184 |
| 2011/0082468 A1 * | 4/2011 | Hagag | A61B 34/74 606/130 |
| 2011/0251461 A1 * | 10/2011 | Gomez Gonzalez | A61B 17/3421 600/201 |
| 2013/0261651 A1 * | 10/2013 | Zhou | A61B 17/3462 606/185 |

(Continued)

FOREIGN PATENT DOCUMENTS

EP 3827780 6/2021

OTHER PUBLICATIONS

"European Application Serial No. 22156839.7, Extended European Search Report mailed Jul. 6, 2022", 8 pgs.

*Primary Examiner* — Kevin T Truong
(74) *Attorney, Agent, or Firm* — SCHWEGMAN LUNDBERG & WOESSNER, P.A.

(57) ABSTRACT

An instrument retainer can be receivable in an end effector of a surgical arm. The instrument retainer can include a body and a collar. The body can include an instrument bore extending through the body along a longitudinal axis. The body can also include a distal portion and a proximal portion including a proximal surface. The proximal portion can form a radiused funnel connecting the instrument bore to the proximal surface. The collar can extend radially outward from the body. The collar can be engageable with the end effector to position the instrument retainer within the end effector.

20 Claims, 5 Drawing Sheets

(56) References Cited

U.S. PATENT DOCUMENTS

| | | | |
|---|---|---|---|
| 2014/0018732 A1* | 1/2014 | Bagaoisan | A61M 25/0136 |
| | | | 604/95.04 |
| 2015/0366582 A1 | 12/2015 | Lauchner | |
| 2015/0366583 A1* | 12/2015 | Druma | A61B 17/0218 |
| | | | 600/204 |
| 2017/0086968 A1* | 3/2017 | Prescott | A61F 11/00 |
| 2019/0192254 A1* | 6/2019 | Garbus | A61B 46/10 |
| 2019/0374248 A1* | 12/2019 | Grueebler | A61F 9/00781 |
| 2020/0078068 A1 | 3/2020 | Wall et al. | |
| 2020/0100814 A1* | 4/2020 | Zhu | A61B 17/3474 |
| 2021/0153914 A1* | 5/2021 | Lomeli | A61B 17/7076 |

\* cited by examiner

SURGICAL INSTRUMENT GUIDE TUBE

CLAIM OF PRIORITY

This patent application claims the benefit of priority, under 35 U.S.C. Section 119(e), to Patrice Bonaric U.S. Patent Application Ser. No. 63/149,548, entitled "SURGICAL INSTRUMENT GUIDE TUBE," filed on Feb. 15, 2021, which is hereby incorporated by reference herein in its entirety.

BACKGROUND

Modern surgical procedures can include use of a variety of tools. Some of these procedures can use tools, such as a tube or needle, that can be guided to a specific location on a patient. To increase accuracy and precision, surgical arms or robotic surgical arms can be used to guide the instrument or to position the instrument to help guide the instrument along a trajectory or plane. In such examples, the surgical arm can be configured to receive an instrument guide for guiding one or more types of surgical instruments.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

During guided surgeries, surgical instruments such as needles, guide wires, or guide tubes, can be inserted into a patient's anatomy by passing through a surgical guide held in place by a surgical arm (such as a robotic arm). The surgical instruments can be accurately maintained on a planned trajectory by the guide connected to a robotic arm to reach a selected target. Various surgical guides exist for holding and guiding surgical instruments during a surgical procedure. The guides often must be manufactured to tight tolerances to ensure that the instrument extending through the guide is precisely on the planned or selected trajectory.

When a surgical instrument is first inserted into a bore of such a guide, alignment and insertion can be difficult due to the tight tolerances. This is especially problematic when using sharp instruments, such as a drill bit that can mar, chip, or otherwise damage an edge defining the inlet or opening of the bore upon insertion of the instrument into the bore. Due to the tight tolerances, a relatively small amount of damage to the bore inlet can make insertion of the instrument into the bore difficult or impossible, which can adversely affect a surgical procedure. Also, when the bore is damaged, additional force applied to insert the instrument can cause the instrument to bend and break. Similarly, damage to a distal end or outlet of the guide can cause complications in insertion or removal of the instrument from the bore of the guide, which can adversely impact a procedure.

This disclosure can help to address these issues, among others, by providing a surgical instrument retainer that can includes a proximal portion defining a funnel or radiused inlet surface. The radiused inlet can allow for instruments or tools (such as drill bits) to be inserted into the radiused portion of the bore at various angles with respect to a longitudinal axis of the bore and can allow the instrument to bend upon insertion without breaking. The radiused or curved portion can guide the tool into a central portion of the bore that has a straight cut and a relatively tighter tolerance for guiding the trajectory of the tool during operation, such as a drilling operation. If the proximal portion or opening is damaged, a user will still be able to insert tools at various angles because the inlet of the funnel is relatively larger than the guiding portion of the bore. Similarly, a distal portion of the retainer can include an undercut or counterbore to help limit damage to a distal portion of the bore.

The above discussion is intended to provide an overview of subject matter of the present patent application. It is not intended to provide an exclusive or exhaustive explanation of the invention. The description below is included to provide further information about the present patent application.

Figure 1:
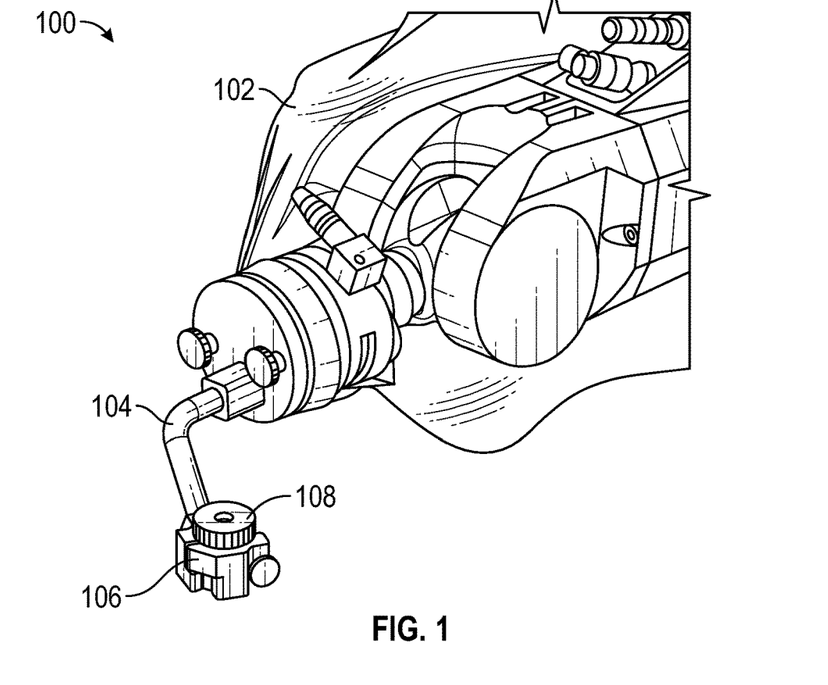
FIG. 1 illustrates an isometric view of surgical system.
Figure 2:
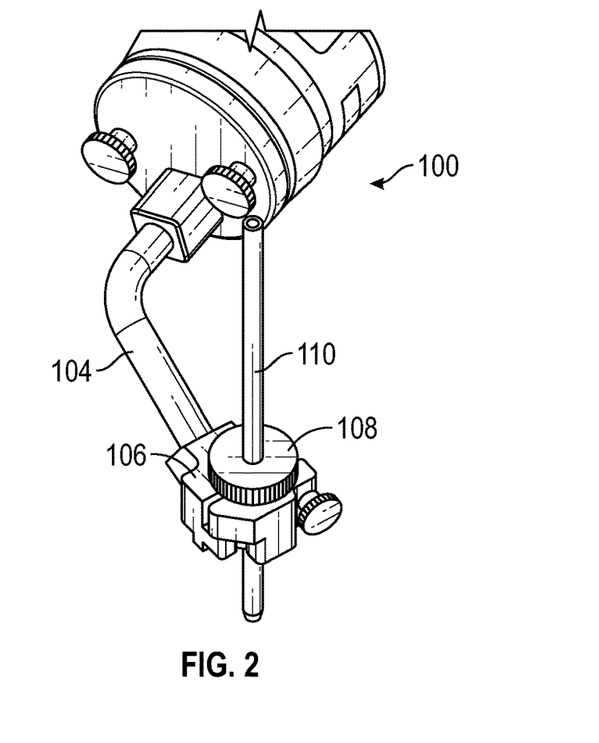
FIG. 2 illustrates an isometric view of a portion of a surgical system.

FIG. 1 illustrates an isometric view of surgical system 100. FIG. 2 illustrates an isometric view of a portion of the surgical system 100. FIGS. 1 and 2 are discussed together below.

The surgical system 100 can include a surgical arm 102, an end effector 104, an end effector coupler 106, an instrument guide 108, and an instrument 110. The surgical system 100 can be operable (such as by a surgeon or physician) to perform a robotically controlled or assisted procedure or portion of a procedure.

The surgical arm 102 can be a surgical or robotic arm connected to a controller and can be operated to move within space. The surgical arm 102 can be registered to landmarks of the patient (such as a skull, arm, leg, or the like) so that the surgical arm 102 (or controller thereof) knows the position of the surgical arm 102 with respect to the registered portion of the patient. The surgical arm 102 can move autonomously in an example. In another example, the surgical arm 102 can provide a force assist or a force resistance to surgeon or user guided, collaborative movements. In yet another example, a combination of autonomous movement and force assistance or force resistance movement can be performed by or using the surgical arm 102 (e.g., force assistance or force resistance for an initial movement, and autonomously moving a later movement). In an example, the surgical arm 102 can resist an applied force. For example, the surgical arm 102 can be programmed to stay within a particular range of locations or a particular position, move at a particular speed (e.g., resist a higher speed by resisting force), or the like. In some examples, the surgical arm 102 can be a non-robotic or non-guided surgical arm, such as a surgical arm affixable to a bed or other support and including one or more lockable joints allowing a user to position and lock the surgical arm 102 as desired.

The end effector 104 can be a member connected to the surgical arm 102 and can optionally be removably connected to the surgical arm 102. The end effector 104 can be connected to the end effector coupler 106 which can be configured to receive a tool or retainer therein or attached thereto. In some examples, the end effector coupler 106 can include a bore that is configured to accept the instrument guide 108.

The instrument guide 108 can include a bore configured to receive the instrument or tool 110 therein or therethrough. The bore of the instrument guide 108 can be configured to receive an instrument of a particular size or shape therein such that the instrument guide 108 can be selected and inserted into the end effector coupler 106 based on the instrument 110.

During a surgical procedure, surgical instruments can be guided to a planned target point within a patient's anatomy by passing the instrument 110 through the surgical instrument retainer 108. For example, as shown in FIG. 2, the instrument 110 can be passed through the bore of the instrument retainer 108. In some procedures, the surgical instrument retainer 108 can accurately retain the surgical instrument 110 in a specific position or can guide the instrument 110 to a specific location or along a specific or selected trajectory. In operation of some examples, the surgical arm 102 can be used to position the end effector 104 and the end effector coupler 106 in a planned position. In some examples, the surgical arm 102 can be used to adjust the position of the surgical instrument retainer 108 before or during the surgical procedure.

During the procedure, the surgical instrument retainer 108 can guide translation of the surgical instrument 110 within the surgical instrument retainer 100 with respect to the surgical instrument retainer 100, the end effector coupler 106, the end effector 104, and with respect to a patient. The surgical instrument retainer 108 can also guide rotation of the instrument 110 (e.g., a drill bit) about an axis of the retainer and the drill bit at the target or along the target trajectory. After the surgical procedure, the surgical instrument retainer 108 can be removed from the end effector coupler 106. The surgical instrument retainer 108 can then be cleaned and sterilized in an autoclave in preparation for a future surgical procedure. The surgical instrument retainer 108 can thereby help perform one or more operations of a surgical procedure.

Figure 3A:
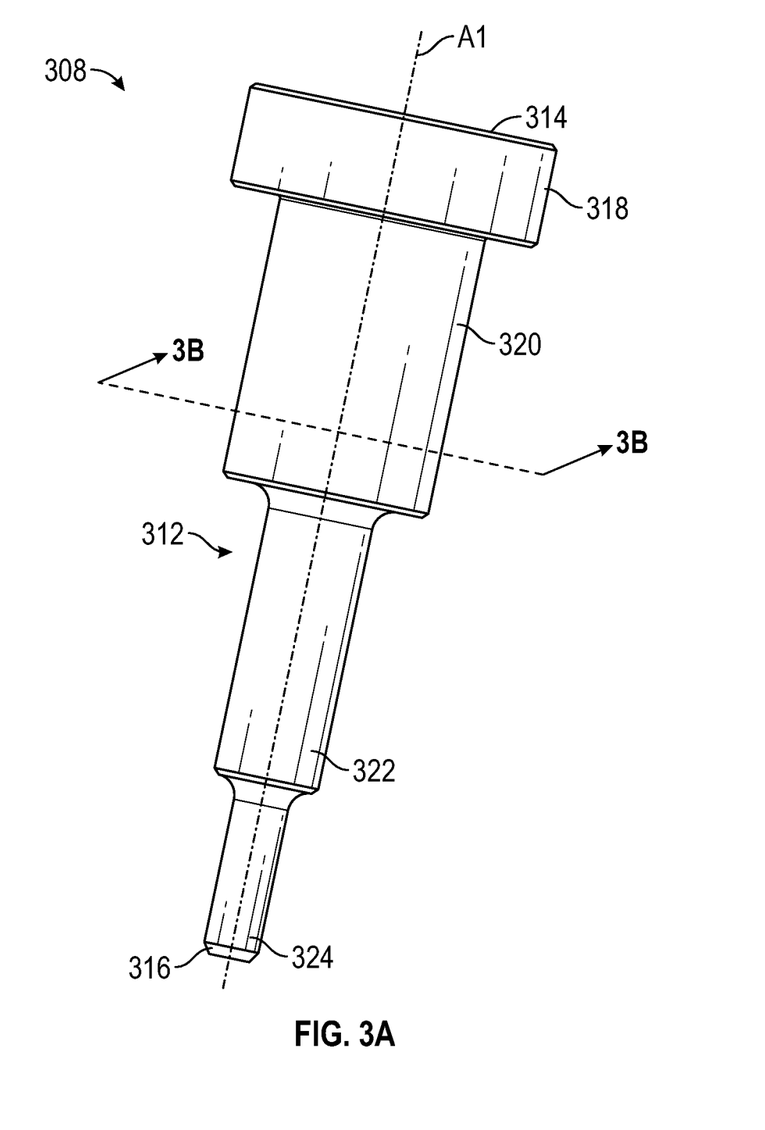
FIG. 3A illustrates an isometric view of a surgical instrument retainer.
Figure 3B:
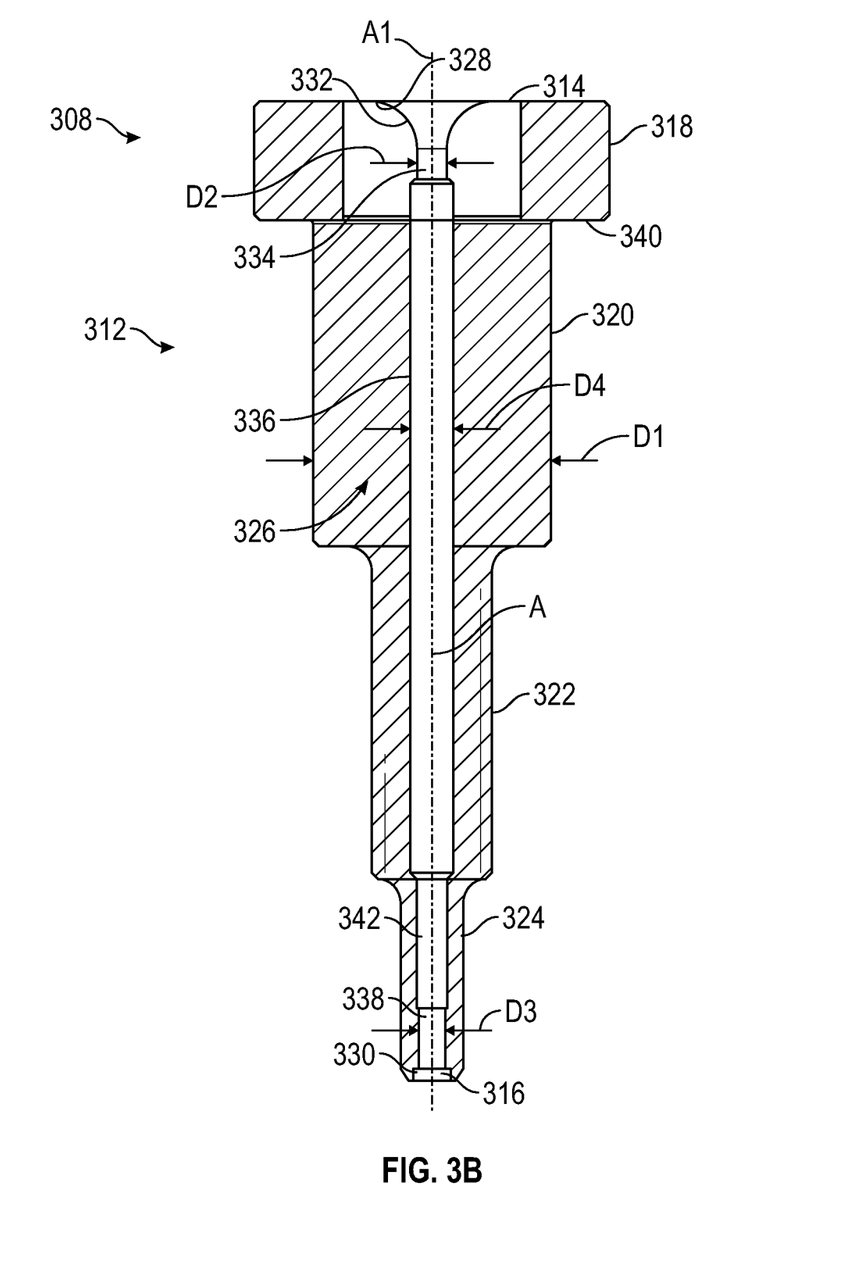
FIG. 3B illustrates a cross-section across indicators 3B-3B of FIG. 3A of the instrument retainer.

FIG. 3A illustrates an isometric view of a surgical instrument retainer 308. FIG. 3B illustrates a cross-section across indicators 3B-3B of FIG. 3A of the instrument retainer 308. The surgical instrument retainer 308 can be similar to the surgical instrument retainer 108 where like numerals can represent like components. The surgical instrument retainer 308 can include a body 312, a proximal portion 314, and a distal portion 316. The body 312 can include a collar 318, a first tier 320, a second tier 322, a third tier 324, and a bore 326. FIG. 3B shows that the bore 326 can include an inlet 328, an outlet 330, a curved or radiused portion 332, a proximal guide portion 334, a middle portion 336, and a distal guide portion 338. The body 312 can also define an axis A1. FIGS. 3A and 3B also show orientation indicators Proximal and Distal.

The body 312 can be a rigid or semi-rigid body made of materials such as one or more of metals, plastics, foams, elastomers, ceramics, composites, combinations thereof, or the like. The body 312 can extend generally along the longitudinal axis A1, which can optionally be a straight axis. The collar 318 can extend radially outward from the tiered portion 320 to define a distal collar surface 340 for engaging an end effector coupler (e.g., the coupler 106) to position the retainer 308 axially within the coupler.

The first tiered portion 320 can define an outer diameter D1 sized to fit within the end effector coupler to secure the position of the retainer 308 radially within the coupler. The diameter D1 can be smaller than a diameter of the collar 318 to help allow the collar 318 to limit distal translation of the retainer 308 into the coupler. A distal end of the first tiered portion 320 can connect to a proximal end of the second tiered portion 322. A distal end of the second tiered portion 322 can connect to a proximal end of the third tiered portion 324. The second tiered portion 322 can have a diameter smaller than the first tiered portion 320 and the third tiered portion 324 can have a diameter smaller than the second tiered portion 322. Such a stepped or tiered configuration of the body 312 can provide a surgeon or physician with better vision of the distal end 316 of the retainer 308 which can improve speed and accuracy of one or more steps of a procedure, such as a drilling procedure. The third tiered portion 324 can also allow for insertion of the body 312 into relatively small spaces, such as between electrodes that have already been placed in a bone (e.g., skull).

As shown in FIG. 3B, the bore 326 can extend through the body 312 along the axis A1 between the inlet 328 at the proximal portion 314 and the outlet 330 at the distal portion 316. The radiused portion 332 can be a radiused funnel. The radiused portion 332 can be a solid revolution of a radiused line (or curved line or arced line) revolved around the longitudinal axis A1. The lines can be revolved around another axis in other examples. A distal portion or end or termination of the radiused portion 332 can be connected to the proximal guide portion 334. The radiused portion 332 can be angled or curved to help guide an instrument into the proximal guide portion 334 of the bore 326, as discussed in further detail below. In some examples, the outlet 330 can also be radiused or curved, which can help to reduce the likelihood of damaging the bore 326 at the outlet 330.

The proximal guide portion 334 can be connected to the inlet 328 by the curved or radiused portion 332. The proximal guide portion 334 can define a diameter D2 sized to be slightly larger than a diameter of the instrument (e.g., drill bit) to help guide the instrument in, or, or along a selected trajectory. For example, the diameter D2 can be about 0.05 to 0.5 millimeters larger than the diameter of the drill bit. In some examples, the diameter D2 can be 0.2 millimeters larger than the diameter of the drill bit. Also, the distal guide portion 338 can define a diameter D3 sized to be slightly larger than a diameter of the instrument (e.g., drill bit) to help guide the instrument in, or, or along the selected trajectory.

The diameters D2 and D3 can be the same in some examples. In some examples, the diameter D2 and D3 can be the same but the tolerances can be different. For example a tolerance for the diameter D3 can be smaller than a tolerance for the diameter D2 because the diameter D3 can be the closest guide portion to the target point. For the diameter D2 can be about 0.1 to 0.2 mm larger than the diameter of the drill bit and the diameter D3 can be about 0 to 0.1 mm larger than the diameter of the drill bit.

The proximal guide portion 334 can be connected to the middle portion 336, which can extend axially from the collar 318 through the first tiered portion 320 and through all or a portion of the second tiered portion 322 such that the middle portion 336 can be a majority of an axial length of the bore 326. The middle portion 336 can define a diameter D4 that is larger than the diameters D2 and D3, which can help to reduce interaction between the instrument (e.g., 110) and the bore 326, such as during drilling operations, which can help to reduce friction and help to limit heating of the instrument (e.g., drill bit).

In operation of some examples, such as when the instrument retainer 308 is positioned within an end effector coupler (e.g., coupler 106) during a procedure or surgery, the physician or surgeon can insert a tool (e.g., a drill bit) into the opening 328 of the bore 326 to begin a drilling operation. If the tool or drill bit is not sufficiently aligned with the axis A1, a tip of the tool can engage the curved surface 332. The curved surface 332 (or the funnel) can, upon engagement, guide the tool distally and into the proximal guide portion 334 while helping to minimize marring or deforming of the inlet of the proximal guide portion 334.

The instrument can continue to be inserted along the axis A1 through the proximal guide portion 334 through the middle portion 336, into the distal guide portion 338, and through the outlet 330. The instrument can continue to be moved or translated through the bore 326 until the target is engaged. A drill operation can then be performed while the drill bit is withing the bore 326, where the bore 326 (especially the proximal guide portion 334 and the distal guide portion 338) can help to maintain a desired trajectory of the drill bit and can help to maintain rotation of the drill bit about the axis A1, while helping to minimize friction between the surgical instrument retainer 308 and the tool (e.g., drill bit). Optionally, an intermediate guide portion 342 of the bore 326 can be included between the middle portion 336 and the distal guide portion 338 to help guide the tool from the middle portion 336 into the distal guide portion 338.

Figure 4A:
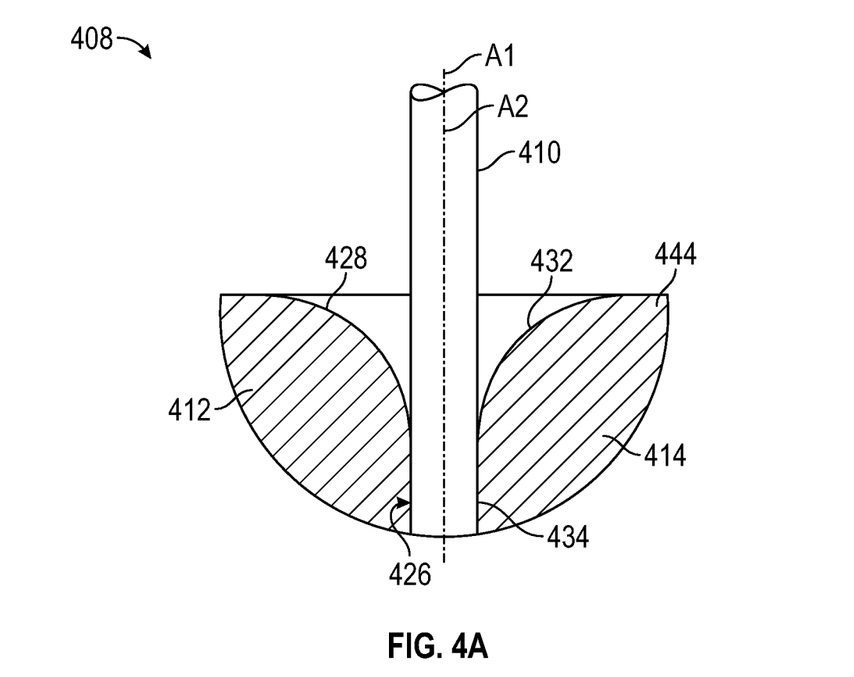
FIG. 4A illustrates an enlarged cross-section of an instrument retainer and a surgical instrument.
Figure 4B:
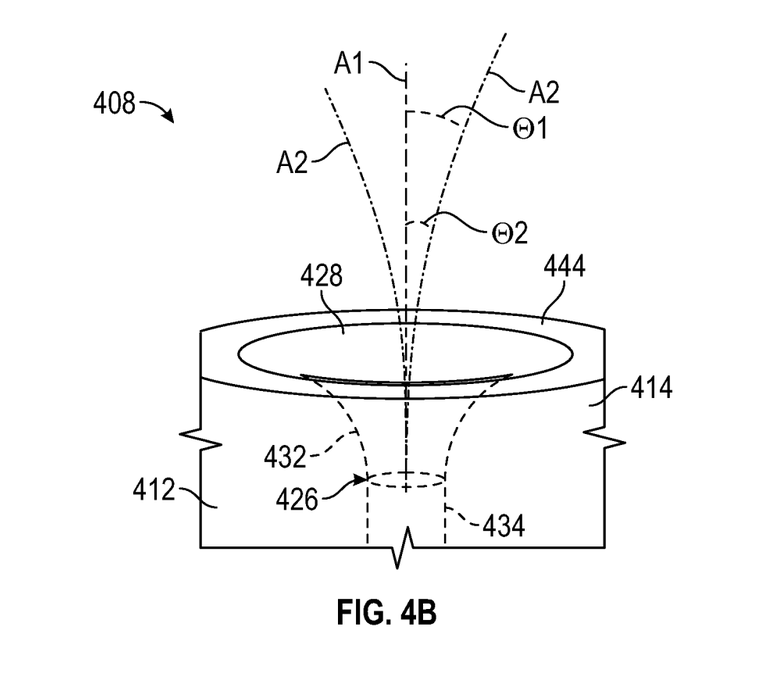
FIG. 4B illustrates an enlarged view of a portion of a surgical instrument retainer.

FIG. 4A illustrates an enlarged cross-section of an instrument retainer 408 and a surgical instrument 410. FIG. 4B illustrates an enlarged view of a portion of the surgical instrument retainer 408. FIGS. 4A and 4B are discussed together below. The instrument retainer 408 can be similar to the instrument retainers 108 or 308 discussed above and can include features that can be included in the instrument retainers 108 or 308, where like numerals can represent like components. FIGS. 4A and 4B show axes A1 and A and orientation indicators Proximal and Distal. FIG. 4B shows an angle θ1 and an angle θ2.

FIG. 4A shows how an instrument 410 can be inserted into an opening 428 of a proximal portion 414 of the instrument guide 408. The curved surface 432 can guide the instrument 410 into the proximal guide portion 434 of a bore 426. Once the instrument 410 (e.g., drill bit) is inserted into the proximal guide 434, an axis A2 of the instrument 410 can be aligned with the axis A1 of the bore 426.

FIGS. 4A and 4BB also show a proximal surface 444 of the proximal portion 414 that can define, at least in part, the inlet 428 of the bore 426. FIGS. 4A and 4B show how the surface 444 can transition to the opening 428 and to the curved surface 423 before transitioning to a straight cut or straight bore of the proximal guide portion 444. The proximal guide portion 434 can be substantially straight or can be straight. Substantially can be almost straight, nearly straight, or within a tolerance or margin of error of straight or coaxial with the axis A1.

The radiused surface 432 of FIGS. 4A and 4B can be a radiused funnel that is a solid revolution of a radiused line revolved around the longitudinal axis A1. In some examples, a radius of curvature of the radiused surface 432 can be between three millimeters and five millimeters. In some examples, a radius of curvature of the radiused surface 432 can be between 0.5 millimeters and fifty millimeters. In some examples, radius of curvature of the radiused surface 432 can be 4 millimeters. In some examples, the surface 432 can be a directing surface that can be radiused, elliptical, angled, tapered, chamfered, or the like.

FIG. 4B shows the axis A2 of the instrument 410 that is deviated from the axis A1 of the bore 426, which can define the angles θ1 and θ2 between the axis A1 and A2. The angle θ1 can be relatively large (and larger than the angle θ2) to show or represent that as the distal end or tip of the instrument 410 engages the surface 432, the axes A1 and A2 can form a large angle, for example, 20 degrees. The angle θ2 can be a relatively smaller angle, for example 5 degrees. The reduction in angle between the axes A1 and A2 can represent an instrument being guided along the axis A2 by the surface 432 to align the instrument 410 and the axis A2 when the axis A2 is deviated from (or not coaxial with) the axis A1. The radiused surface 432 can be configured to guide instruments angled at 5, 10, 15, 20, 25 degrees or the like to be coaxial with the axis A1 by contact between the radiused surface 432 and a distal end of the instrument 410 as the instrument is inserted into the bore 426 proximally to distally. In some examples, a radius of curvature of the radiused surface 432 can be configured to guide into the instrument bore 426 elongate instruments at an angle of twenty degrees or less from the longitudinal axis.

Figure 5A:
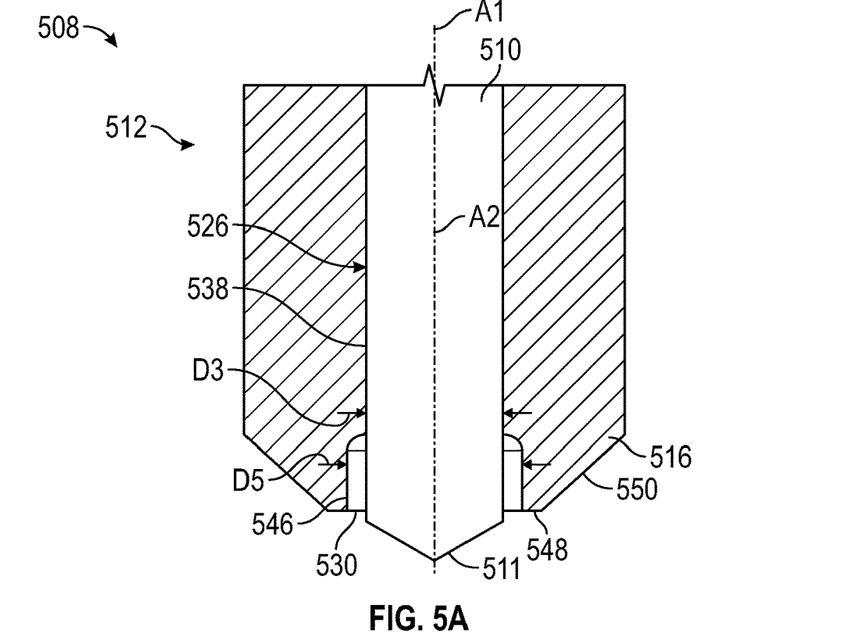
FIG. 5A illustrates an enlarged cross-section of an instrument retainer and a surgical instrument.
Figure 5B:
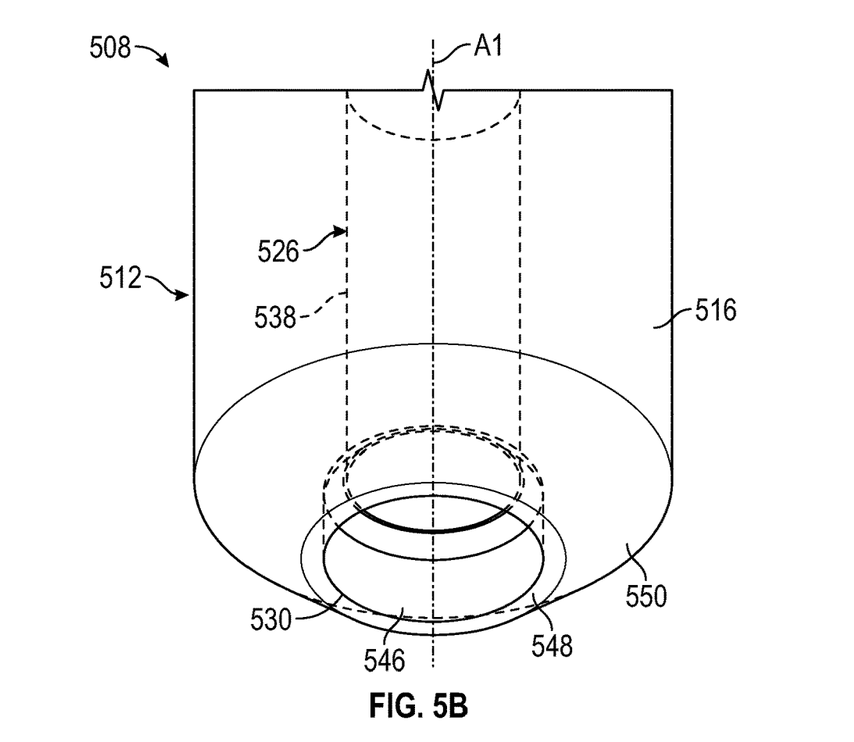
FIG. 5B illustrates an enlarged view of a portion of a surgical instrument retainer.

FIG. 5A illustrates an enlarged cross-section of an instrument retainer 508 and a surgical instrument 510. FIG. 5B illustrates an enlarged view of a portion of the surgical instrument retainer 508. FIGS. 5A and 5B are discussed together below. The instrument retainer 508 can be similar to the instrument retainers 108, 308, or 408 discussed above, such that the instrument retainer 508 can include features that can be included in the instrument retainers 108, 308, or 408 or the instrument retainers 108, 308, or 408 can include features of the instrument retainer 508 or any of the other instrument retainers discussed herein. Like numerals of the various instrument retainers can represent like components. FIGS. 5A and 5B show axis A1, axis A2, and orientation indicators Proximal and Distal.

FIG. 5A shows that a distal portion 516 of a body 512 of the instrument retainer 508 can include a counterbore 546 connected to a distal guide portion 538 of a bore 526 of the body 512. The instrument bore 526 and the counterbore 546 can be coaxial. A proximal portion of the counterbore 546 can connect to the distal guide portion 538 and a distal portion of the counterbore 546 can terminate at a distal end of the distal portion 516 of the body 512. For example, the counterbore 546 can connect to a distal surface 548 of the body 512 at an outlet 530 of the bore 526.

The counterbore 546 can extend proximally into the body 512 from the distal end or distal surface 548 to define an axial length of the counterbore 546. In some examples, the axial length of the counterbore 546 can be between 0.1 millimeters and 10 millimeters. In some examples the axial length of the counterbore 546 can be 1 millimeter. FIG. 5A also shows a diameter D5 of the counterbore 546, which can be 0.1 millimeter to 1 millimeter larger than the diameter of the drill bit. In some examples, the diameter D5 can be 0.5 millimeters larger than the drill bit diameter.

The distal surface 548 can be perpendicular to the longitudinal axis A1 or can be substantially perpendicular to the axis A1, where substantially can be almost perpendicular, nearly perpendicular, or within five degrees of perpendicular to the axis A1. The distal surface 548 can extend radially outward from the bore 526 and can connect to an outer tapered surface 550, The outer tapered surface 550 can extend radially outward and proximally from the distal surface 548.

In operation, it can occur that an instrument retainer is accidentally dropped on a distal end of a body of the retainer, such as on a distal surface, which can cause the distal surface to deform to change the outlet shape or size, which can cause the drill bit or instrument to not be insertable through the outlet of the bore or can cause the instrument to not be removable from the bore. Accidental engagement with the distal portion of the body with other instruments or surfaces can cause similar issues.

The instrument guide 508 can help to reduce issues of insertion and removal of instruments into and out of the bore 526 that can be caused by small deformities caused by accidental damage to the distal portion 516 of the body 512 by including the counterbore 546. Because the counterbore 546 is located at the outlet 530 of the bore 526, because the counterbore 546 is relatively larger than the distal guide portion 538, and because the distal guide portion 538 directs the trajectory of the instrument 510 and not the counterbore 546, operation of the instrument or drill bit 510 can be unimpacted (or less impacted) by small deformations in the opening 530 of the bore 526 or of the distal surface 548 of the distal portion 516 of the body 512 of the surgical instrument guide 508. The counterbore 546 can thereby help to reduce problems encountered during operating procedures using the instrument guide 508 together with a surgical or robotic arm, such as a drilling operation.

NOTES AND EXAMPLES

The following, non-limiting examples, detail certain aspects of the present subject matter to solve the challenges and provide the benefits discussed herein, among others.

Example 1 is an instrument retainer receivable in an end effector of a surgical arm, the instrument retainer comprising: a body including an instrument bore extending through the body along a longitudinal axis, the body comprising: a proximal portion including a proximal surface, the proximal portion forming a radiused funnel connecting the instrument bore to the proximal surface; and a distal portion; and a collar extending radially outward from the body, the collar engageable with the end effector to position the instrument retainer within the end effector.

In Example 2, the subject matter of Example 1 optionally includes the distal portion of the body further comprising a counterbore terminating at a distal end of the distal portion of the body.

In Example 3, the subject matter of Example 2 optionally includes wherein the instrument bore and the counterbore are coaxial.

In Example 4, the subject matter of any one or more of Examples 2-3 optionally include wherein the counterbore extends proximally into the body from the distal end to define an axial length of the counterbore of one millimeter.

In Example 5, the subject matter of Example 4 optionally includes wherein the distal portion defines a distal surface connected to the counterbore, the distal surface perpendicular to the longitudinal axis.

In Example 6, the subject matter of Example 5 optionally includes wherein the distal portion defines a tapered surface extending radially outward and proximally from the distal surface.

In Example 7, the subject matter of any one or more of Examples 1-6 optionally include wherein the radiused funnel is a solid revolution of a radiused line revolved around the longitudinal axis.

In Example 8, the subject matter of any one or more of Examples 1-7 optionally include wherein a radius of curvature of the radiused surface is configured to guide into the instrument bore elongate instruments at an angle of twenty degrees or less from the longitudinal axis.

Example 9 is an instrument retainer receivable in an end effector of a surgical arm, the instrument retainer comprising: a body including an instrument bore extending through the body along a longitudinal axis, the body comprising: a proximal portion including a proximal surface, the proximal portion forming a radiused surface connecting the instrument bore to the proximal surface; and a distal portion defining a counterbore terminating at a distal end of the distal portion of the body; and a collar extending radially outward from the body, the collar engageable with the end effector to position the instrument retainer within the end effector.

In Example 10, the subject matter of Example 9 optionally includes wherein the instrument bore and the counterbore are coaxial.

In Example 11, the subject matter of Example 10 optionally includes wherein the distal portion defines a distal surface connected to the counterbore, the distal surface perpendicular to the longitudinal axis.

In Example 12, the subject matter of Example 11 optionally includes wherein the distal portion defines a tapered surface extending radially outward and proximally from the distal surface.

In Example 13, the subject matter of Example 12 optionally includes wherein a radius of curvature of the radiused surface is configured to guide into the instrument bore elongate instruments at an angle of twenty degrees or less from the longitudinal axis.

Example 14 is an instrument retainer receivable in an end effector of a surgical arm, the instrument retainer comprising: a body including an instrument bore extending through the body along a longitudinal axis, the body comprising: a proximal portion including a proximal surface, the proximal portion forming a directing surface connecting the instrument bore to the proximal surface, at least a portion of the directing surface non-parallel with the longitudinal axis; and a distal portion; and a collar extending radially outward from the body, the collar engageable with the end effector to position the instrument retainer within the end effector.

In Example 15, the subject matter of Example 14 optionally includes wherein the directing surface is radiused, elliptical, or chamfered.

In Example 16, the subject matter of Example 15 optionally includes wherein the directing surface is radiused defining a radius of curvature of four millimeters.

In Example 17, the subject matter of any one or more of Examples 15-16 optionally include wherein a radius of curvature of the radiused surface is configured to guide into the instrument bore elongate instruments at an angle of twenty degrees or less from the longitudinal axis.

In Example 18, the subject matter of any one or more of Examples 14-17 optionally include the distal portion of the body further comprising a counterbore terminating at a distal end of the distal portion of the body.

In Example 19, the subject matter of Example 18 optionally includes wherein the instrument bore and the counterbore are coaxial.

In Example 20, the subject matter of Example 19 optionally includes wherein the distal portion defines a distal surface connected to the counterbore, the distal surface perpendicular to the longitudinal axis.

In Example 21, the subject matter of any one or more of Examples 14-20 optionally include wherein a radius of curvature of the directing surface is between three millimeters and five millimeters.

In Example 22, the subject matter of any one or more of Examples 14-21 optionally include wherein a radius of curvature of the directing surface is configured to guide into the instrument bore elongate instruments at an angle of twenty degrees or less from the longitudinal axis.

In Example 23, the apparatuses, systems, or method of any one or any combination of Examples 1-22 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An instrument retainer receivable in an end effector of a surgical arm, the instrument retainer comprising:
a body including an instrument bore extending through the body along a longitudinal axis, the body comprising:
a proximal portion including a proximal surface, the proximal portion forming a radiused funnel connecting the instrument bore to the proximal surface, the radiused funnel at least partially defining an inlet; and
a distal portion; and
a collar extending radially outward from the body, the body connected to a distal portion of the collar, and the collar defining a distal collar surface connected to the body, the distal collar surface engageable with the end effector to position the instrument retainer within the end effector, and the radiused funnel and the inlet located at a proximal portion of the collar;
wherein the instrument bore has a first portion at a first location adjacent the radiused funnel, the first portion including a first internal diameter, wherein the instrument bore has a second portion connected to the first portion, the second portion including a second internal diameter that is larger than the first internal diameter, and wherein the instrument bore has a third portion at a third location connected to and distal of the second portion, the third portion including a third internal diameter that is smaller than the second internal diameter and that is equal to the first internal diameter.

2. The instrument retainer of claim 1, the distal portion of the body further comprising a counterbore terminating at a distal end of the distal portion of the body.

3. The instrument retainer of claim 2, wherein the instrument bore and the counterbore are coaxial.

4. The instrument retainer of claim 2, wherein the counterbore extends proximally into the body from the distal end to define an axial length of the counterbore of one millimeter.

5. The instrument retainer of claim 4, wherein the distal portion defines a distal surface connected to the counterbore, the distal surface perpendicular to the longitudinal axis.

6. The instrument retainer of claim 5, wherein the distal portion defines a tapered surface extending radially outward and proximally from the distal surface.

7. The instrument retainer of claim 1, wherein the radiused funnel is a solid revolution of a radiused line revolved around the longitudinal axis.

8. The instrument retainer of claim 1, wherein a radius of curvature of the radiused funnel is configured to guide into the instrument bore elongate instruments at an angle of twenty degrees or less from the longitudinal axis.

9. An instrument retainer receivable in an end effector of a surgical arm, the instrument retainer comprising:
a body including an instrument bore extending through the body along a longitudinal axis, the body comprising:
a proximal portion including a proximal surface, the proximal portion forming a radiused surface connecting the instrument bore to the proximal surface, the radiused surface at least partially defining an inlet; and
a distal portion defining a counterbore terminating at a distal end of the distal portion of the body; and
a collar extending radially outward from the body to define a distal collar surface, the distal collar surface engageable with the end effector to position the instrument retainer within the end effector, and the radiused surface and the inlet located at a proximal portion of the collar;

wherein the instrument bore has a first portion at a first location adjacent the radiused surface, the first portion including a first internal diameter, wherein the instrument bore has a second portion connected to the first portion, the second portion including a second internal diameter that is larger than the first internal diameter, and wherein the instrument bore has a third portion at a third location connected to and distal of the second portion, the third portion including a third internal diameter that is smaller than the second internal diameter and that is equal to the first internal diameter.

10. The instrument retainer of claim 9, wherein the instrument bore and the counterbore are coaxial.

11. The instrument retainer of claim 10, wherein the distal portion defines a distal surface connected to the counterbore, the distal surface perpendicular to the longitudinal axis.

12. The instrument retainer of claim 11, wherein the distal portion defines a tapered surface extending radially outward and proximally from the distal surface.

13. The instrument retainer of claim 12, wherein a radius of curvature of the radiused surface is configured to guide into the instrument bore elongate instruments at an angle of twenty degrees or less from the longitudinal axis.

14. An instrument retainer receivable in an end effector of a surgical arm, the instrument retainer comprising:
   a body including an instrument bore extending through the body along a longitudinal axis, the body comprising:
      a proximal portion including a proximal surface, the proximal portion forming a directing surface at least partially defining an inlet, the directing surface connecting the instrument bore to the proximal surface at a proximal end of the body, at least a portion of the directing surface non-parallel with the longitudinal axis; and
      a distal portion; and
   a collar extending radially outward from the body, the collar engageable with the end effector to position the instrument retainer within the end effector;
   wherein the instrument bore has a first portion at a first location adjacent the directing surface, the first portion including a first internal diameter, wherein the instrument bore has a second portion connected to the first portion, the second portion including a second internal diameter that is larger than the first internal diameter, and wherein the instrument bore has a third portion at a third location connected to and distal of the second portion, the third portion including a third internal diameter that is smaller than the second internal diameter and that is equal to the first internal diameter.

15. The instrument retainer of claim 14, wherein the directing surface is radiused, elliptical, or chamfered.

16. The instrument retainer of claim 15, wherein the directing surface is radiused defining a radius of curvature of four millimeters.

17. The instrument retainer of claim 15, wherein a radius of curvature of the directing surface is configured to guide into the instrument bore elongate instruments at an angle of twenty degrees or less from the longitudinal axis.

18. The instrument retainer of claim 14, the distal portion of the body further comprising a counterbore terminating at a distal end of the distal portion of the body.

19. The instrument retainer of claim 14, the distal portion of the body comprising a counterbore terminating at a distal end of the distal portion of the body, wherein the distal portion defines a distal surface connected to the counterbore, the distal surface perpendicular to the longitudinal axis.

20. The instrument retainer of claim 19, the body comprising:
   a first tier connected to the collar and defining a first outer diameter that is smaller than an outer diameter of the collar;
   a second tier connected to the first tier and defining a second outer diameter that is smaller than the first outer diameter;
   a third tier connected to the second tier and defining a third outer diameter that is smaller than the second outer diameter, the instrument bore extending through the first tier, the second tier, and the third tier.

* * * * *